Jan. 13, 1942.    C. A. CAMPBELL    2,270,110
SANDING SYSTEM WITH BRAKING RATIO CONTROL
Filed Nov. 25, 1940    4 Sheets-Sheet 1

Inventor
Charles A. Campbell
Deceased
Carrie E. Campbell
Administratrix
By
Attorneys Patented Jan. 13, 1942

2,270,110

UNITED STATES PATENT OFFICE 2,270,110

SANDING SYSTEM WITH BRAKING RATIO CONTROL

Charles A. Campbell, deceased, late of Watertown, N. Y., by Carrie E. Campbell, administratrix, Watertown, N. Y., assignor to The New York Air Brake Company, a corporation of New Jersey Application November 25, 1940, Serial No. 367,144

7 Claims. (Cl. 291—15)

This invention relates to sanding devices and particularly to sanding devices on cars or trains which are, or at times may be, operated at high speed.

The development of high speed braking systems, particularly those with speed control or decelerometer control, has led to the use of braking ratios so high that sanding on all braked wheels as an incident to brake applications has been found desirable. While the adhesion under favorable rail conditions is adequate, sliding is apt to occur if a portion of the rail is wet or if there is any local unfavorable rail condition of even moderate extent. Wheel-sliding, once started, cannot be stopped except by release of the brakes.

In a related application there is described and claimed a device which imposes a limit on the intensity of application in the event that any sander in the train is inoperative. The present application relates to a more refined embodiment of the same basic idea. Important distinctions are that if a sander is inoperative, only the brakes associated with wheels sanded by such sander are limited as to their action; and further the limitation is a proportional one and effective not merely at the maximum but over the entire range of brake controlling action. This result is secured by interposing a variable ratio relay between the brake controlling valve device and the brake cylinders and rendering a low ratio effective when the sander is inoperative, and a higher ratio or ratios effective when the sander is operative.

For example, with a high speed electro-pneumatic braking system, say schedule HSC, with either speed control or deceleration control effected from the head of the train through application and release circuits controlling straight air application and release of the brakes, it is practicable to use a safety control circuit on each car and individual to that car. This circuit, to suggest one example, would include a battery (such as the usual car lighting battery) and switching means responsive to the condition of units of the sanding system. If the switching means maintain the circuit closed, and if a straight air application is made, the brake cylinder relay would be set to give a high braking ratio, whereas if the circuit is open, the relay would be set to give a lower braking ratio. Even at the low ratio the brakes remain under speed control or deceleration control, whichever is used on the train, so far as straight air applications are concerned.

It may be remarked that in the HSC system there is both a straight air pipe and an automatic brake pipe, so that the system can be operated on either principle, the automatic brake pipe permitting control of the brakes on the automatic system when a conventional steam locomotive is used, and also serving as a standby or safety device when straight air operation is the primary means for operating the brakes. It is characteristic of schedule HSC that automatic operation controls the brakes through the low ratio component of the relay, and thus in the automatic setting sanding, as an incident to brake application, is not needed.

Another system of braking which has come into use recently and which is described in construction pamphlet No. 39 of The New York Air Brake Company, dated January, 1940, involves a light weight car unit having an automatic brake pipe and a straight air pipe, together with application and release circuits for electric control. These cars are individually equipped with speed governers which establish different braking ratios, according to the speed at which the car is moving. In other words, the speed control is local to the car and not effected from the head end through the application and release circuits, as in the example just discussed. Cars of this light weight type are intended for use under two conditions; one, as trains made up completely of such light weight cars, in which case braking is primarily straight air under speed control, and two, operation in trains with conventional cars having only automatic brakes, in which event the brakes of the light weight cars operate on the automatic principle.

When the speed control circuit is energized, the speed controller operates magnet switches which control a multiple diaphragm relay and thus regulates the intensity of application of the brakes by selecting ratios appropriate to the existing speed. When, however, the speed governor circuit is interrupted, the multiple diaphragm relay is set for a relatively low braking ratio appropriate for use in trains with conventional cars braked on the automatic system. These characteristics permit application of the invention with only minor changes in the braking system.

In applying the invention to equipment of this type the switches which sense the condition of the sanding system are connected in series in the circuit to the speed governor. All these switches must be closed or the speed governor cannot become active. If the governor is inactive, the low braking ratio is had. Consequently, if any of the switches in question is open, the speed governor is inoperative and the brake system operates at the low ratio.

In the accompanying drawings there are illustrated two different applications of the invention to braking systems of the two types just discussed. Various other possible applications of the idea will suggest themselves. The basic thought underlying each illustrated embodiment is that if some vital part of a sanding unit is inactive, then the corresponding braking unit is conditioned for a lower braking ratio appropriate to the lower adhesion characteristic of the absence of sanding.

In the drawings:

Figs. 1, 2 and 3, when assembled with Fig. 2 to the right of Fig. 1 and Fig. 3 below Fig. 1, produce a diagram of the brake and sanding system for one car. In Fig. 3 the ratio changing relay and the control valve therefor are shown in section and on an enlarged scale. Otherwise the diagram is in elevation.

Fig. 4 is a sectional view of the switch which senses an inoperative condition of the sander.

Figure 1:
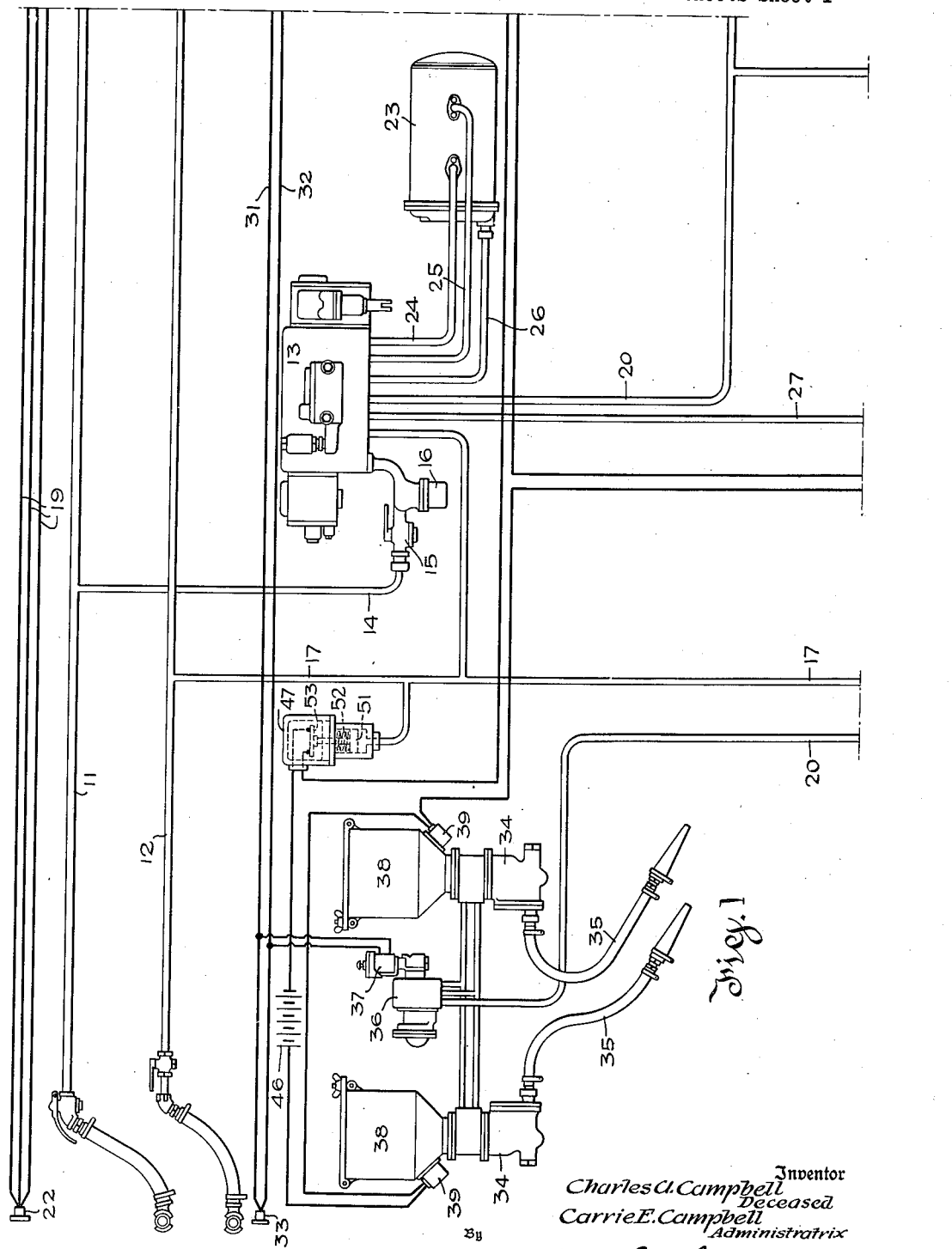
Figure 2:
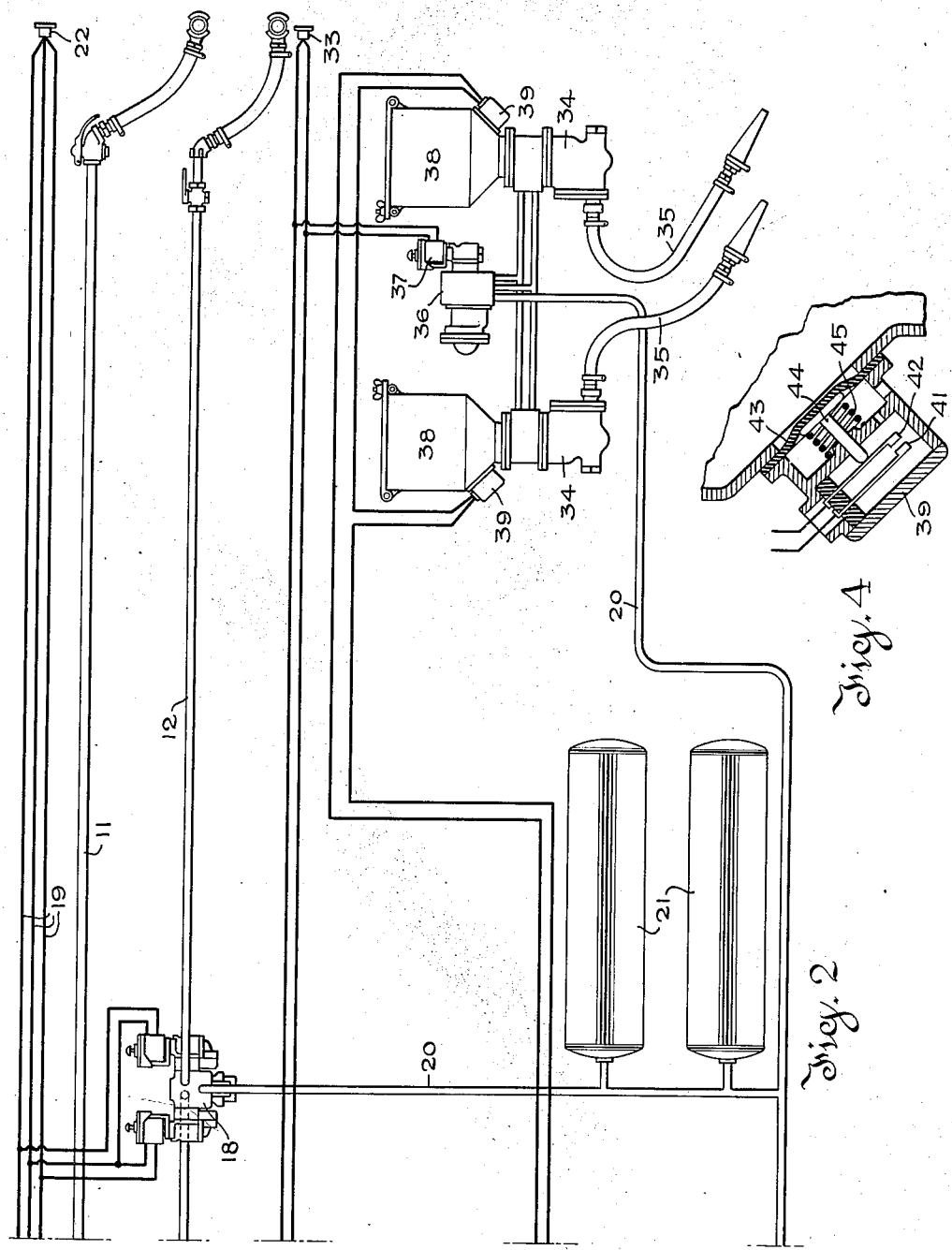
Figure 3:
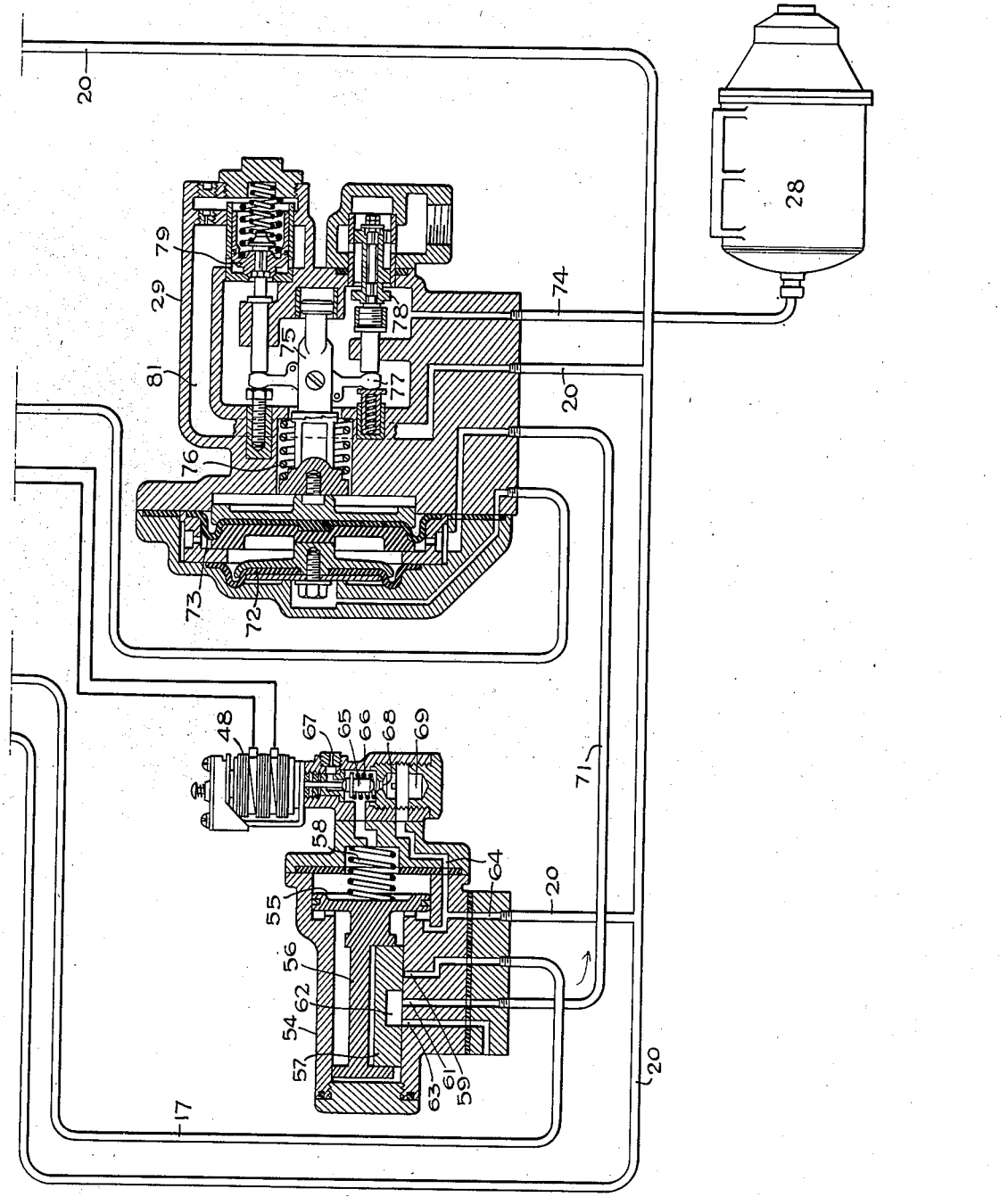

In Figs. 1 to 3 inclusive a brake installation according to schedule HSC is generally indicated. An automatic brake pipe is shown at 11, a straight air pipe at 12 and the control valve, which is of the D-22 type, at 13. The automatic brake pipe 11 is connected to the control valve by a branch pipe 14 and a normally open stop cock 15 and dust collector 16. The straight air pipe is connected with the control valve through a branch pipe 17. Brake pipe 11 and straight air pipe 12 are provided with hose connections and stop cocks (or angle cocks) at their ends according to usual practice to permit connection from car to car in trains.

On the straight air pipe 12 is the electro-magnetic valve unit 18 which is of the admission and exhaust type and functions under the control of the train circuit wires 19 which comprise admission and exhaust circuits controlled from the head of the train to admit air from the supply reservoir pipe 20 to the straight air pipe 12, or to exhaust air from the straight air pipe 12 to atmosphere. The supply reservoirs 21 are charged from the automatic brake pipe 11 through the control valve 13, as usual. The train circuits 19 are connected from car to car by jumpers 22 according to the usual practice. When the system is operating on the straight air principle, pressure in the straight air pipe 12 is both pneumatically and electrically controlled from the head of the train. This control is effected by the so-called Decelakron and EP2 switch mechanism in response to the deceleration rate of the train, or similarly may be controlled by a speed responsive mechanism. Both types of control are known in the art and the first is disclosed, for example, in the patent to Campbell, 2,136,580, Nov. 15, 1938.

The shell 23 houses the auxiliary reservoir to which the connection 24 leads, the emergency reservoir to which connection 25 leads, and the volume chamber to which connection 26 leads. The auxiliary and emergency reservoirs are charged from the brake pipe 11 under control of the control valve 13.

The brake system so far described functions in response to a reduction of pressure in the automatic brake pipe 11, or in response to a rise of pressure in the straight air pipe 12, to operate the control valve 13 in such a way that an appropriate brake applying pressure is developed in the pipe 27 which, for convenience, is called the control pipe. According to principles well understood in the art, the system may be operated as an automatic brake, in which event control is carried out through the automatic brake pipe 11 alone.

Alternatively it may be operated as a combined automatic and straight air system in which both the automatic brake pipe 11 and the straight air pipe 12 are connected throughout the train. Under such conditions the automatic pipe 11 serves as a reservoir charging pipe and as a standby means for producing automatic applications in the event that the train breaks in two. This action results from venting of the brake pipe. However, the normal control of the brakes is effected through the application and release circuits 19 and the straight air pipe 12.

There is a dual electro-pneumatic control at the head of the train which may be in accordance with the Campbell patent above identified. This apparatus, if of the deceleration or of the speed controlled type, rapidly increases pressure in the straight air pipe 12 to apply the brakes and thereafter modulates this pressure in response to train speed or train deceleration, the modulation being normally in the direction of gradual or periodic reduction to insure a smooth and short stop.

The operation of the pneumatic and electric controls are concurrent but the electric anticipates the pneumatic by supplying and exhausting air through the valve mechanisms 18 at intervals throughout the train. Since no novelty is claimed for the brake system, the above general statement of its operation will suffice as a basis for explaining the operation of the sanding system and the safety control mechanism which forms the subject matter of the present application.

The control pipe 27 controls braking pressure in a related brake cylinder 28 and this control is exercised through a two-ratio relay valve 29 whose ratio is selected by the safety control means. Consequently the discussion of the functions and connections of the relay will be deferred until the sanding system has been generally described.

31 and 32 represent the sander circuit wires which extend throughout the train and are connected from car to car by jumpers 33. The sanding circuit is energized from the head of the train by any suitable control means, preferably one which will produce sanding as an incident to any brake application. Examples of such control systems are illustrated in the Campbell Patents 2,196,976 and 2,196,977, April 16, 1940.

When the circuit 31—32 is deenergized, the sanders are inactive and when they are energized the sanders are rendered active. Energization may be produced manually or automatically as an incident to a brake application and both types of control may involve timing factors to keep the sander in operation for a definite period long enough to span the duration of a stop. The control system is not a feature of the invention. The invention imposes no limitation on the type of control which may be used.

The equipment diagrammed in Figs. 1 to 3 inclusive is assumed to have two trucks and accordingly there are shown two groups of sand traps 34, one for each truck, each group being illustrated as comprising two sand traps. Each trap has a sand delivering hose 35 for delivering the sand to the rail and each group of two sand traps is controlled by a corresponding relay valve 36, two such relays being illustrated in the diagram. The relay valves 36 control the supply of cleanout and sanding air to the sand traps 34 and derive their supply of air from the supply reservoir 21 by way of pipe 20. All pipes and branches in free communication with the supply reservoir 21 are given the identifying numeral 20. Each relay is shown as having two pipe connections to each sander, the sanders being assumed to be of that known type in which a cleanout blast followed by a sanding flow of air is used. It is unnecessary to elaborate this because any type of sander might be used.

Each relay 36 is put into operation by energization of the winding 37 of a magnet valve. This winding is connected across the sander lines 31 and 32 so that all the windings 37 throughout the train are energized simultaneously and deenergized simultaneously. When energized they cause the sander to go through its cleanout and sanding cycle, sanding continuing so long as energization continues and terminating upon deenergization of the winding with or without a final cleanout blast, depending upon the design of the relay 36.

Each sander 34 has a sand box 38 for supplying sand. Each box feeds to its trap by gravity flow and each has mounted on its side in a housing 39 the safety switch which senses the condition of the sanding unit as to operativeness. The particular condition sensed in the embodiment illustrated is the presence or absence of sand in the sand box. Any other condition affecting operativeness of the sanding units might be sensed in an analogous manner and the switch now about to be described is typical of a wide range of devices which might be used in place of or in conjunction with the switch illustrated in Fig. 4.

Referring to Fig. 4, the housing 39 encloses two contacts 41 and 42 which are resiliently mounted and tend to separate. The housing 39 clamps at its periphery a flexible diaphragm 43 of rubber or like material which closes an opening in the side of the sand box so that the diaphragm is directly subject to the weight of the sand in the box. Headed plunger 44 reacts inward against the diaphragm 43 and is sustained by a light spring 45. Upon depletion of sand the spring forces the plunger 44 inward, but when there is a reasonable amount of sand in the sand box the spring 45 is overpowered and the plunger 44 moves outward, forcing the contact 42 against the contact 41. Thus the safety switch represented by the contacts 41 and 42 is closed whenever the related sand trap is operative and open whenever it is inoperative as the result of absence of sand. There are four such switches, one for each sand box and all four are connected in series so that the opening of any one interrupts the circuit. As stated, additional switches might be provided to open in response to any other condition in the sanding system indicating inoperativeness, but it is not deemed necessary to complicate the disclosure by showing every conceivable switch which might be used.

The circuit including the switches 41, 42 in series also includes a source of current, such as the car battery 46, a pressure switch 47 and winding 48 of a magnet valve which controls the braking ratio. The function of the switch 47 is to interrupt the circuit just described except when a straight air application is being made.

As will be explained, automatic applications occur at the low braking ratio in any event and do not contemplate sanding as a necessary operation. Hence it suffices to establish the safety control circuit only during straight air applications which normally are made at high braking ratios and therefore require sanding.

The switch 47 includes a piston 51 which is subject to pressure in the branch pipe 17 and hence directly in communication with the straight air pipe 12. The piston 51 is urged downward by a light spring 52 and when forced upward by pressure fluid arriving through the pipe 17 causes its contactor 53 to close the circuit and maintain it closed whenever there is effective braking pressure in the pipe 12. This is simply a device for preventing the waste of electric current.

The winding 48 is mounted on a pilot valve whose housing is indicated at 54. In this housing is a piston 55 connected by a stem 56 with the slide valve 57. The piston and slide valve are forced inward to the left by a coil compression spring 58, in which position the valve 57 blanks the port 59 and connects the port 61 by way of cavity 62 with an atmospheric exhaust port 63. A branch of the supply reservoir pipe 20 is connected by a passage 64 with the slide valve chamber and hence with the space on the inner (left-hand) side of the piston 55. Supply pressure therefore tends to urge the piston 55 outward to the right. In the right-hand position the exhaust port 63 is blanked and the cavity 62 connects the ports 59 and 61.

Winding 48 controls a double-beat poppet valve which, in a normal position, admits supply pressure against the outer side of the piston 55. Pressures acting on the piston 55 are then equal, so the spring shifts the piston and valve to the left. When winding 48 is energized, the double-beat valve closes the last-named connection and vents the space to the right of the piston 55 to atmosphere. The structure for effecting this result comprises the double-beat poppet valve 65 which is urged upward by a spring 66 and which is connected to an armature (within the coil 48). This armature is forced downward when the winding 48 is energized. In the upper position of the valve 65, shown in Fig. 3, the exhaust port 67 is closed and the supply port 68 is open. Port 68 leads from chamber 69, with which a branch of the passage 64 is in constant communication.

The port 59 is connected with the straight air pipe branch 17. The port 61 is connected to the pipe 71 which leads to the relay 29. When the winding 48 is deenergized, the pipe 71, which is the high ratio pipe, is disconnected from the port 59 and vented to atmosphere. This condition exists whenever the straight air pipe 12 is vented (because switch 47 is then open) and whenever any one of the sand reservoirs 38 is depleted (because the contacts 41, 42 then separate). However, if a brake application is made, the closure of switch 47 will energize winding 48 if all the sand boxes on the car are properly filled. In that event winding 48 causes the space to the right of piston 55 to be vented so that the piston moves to the right and valve 57 connects the brake pipe branch 17 with the high ratio pipe 71. Thus if the sanders be operative, the pipe 71 will be at the same pressure as the straight air pipe 12 during any straight air application in which the sanders are operative and will be vented to atmosphere in any straight air application in which the sanders are inoperative.

The relay 29 is of a type familiar in the art and requires only a brief description. There is a small outer diaphragm 72 and a larger inner diaphragm 73, each clamped at its periphery and each having annular folds with central thrust discs which are in thrust relation with each other but not connected with each other. The space on the outer (left-hand) side of the smaller diaphragm 72 is subject to pressure in the control pipe 27. Thus if the control valve 13 responds, either to a reduction of pressure in the automatic brake pipe 11 or to a rise of pressure in the straight air pipe 12, the brake controlling pressure developed in the pipe 27 will become effective on the outer side of the diaphragm 72 and urge the diaphragm inward. In such case its central thrust plate reacts in thrust against the corresponding thrust plate of the larger diaphragm 73.

The space between the diaphragms 72 and 73 is connected to the high ratio pipe 71. Hence, during straight air applications the braking pressure developed in the straight air pipe 12, which will be substantially the same as the pressure developed in the control pipe 27, will be effective on the outer side of the larger diaphragm 73, provided the winding 48 is energized, as it will be if the sand traps are operative. Conversely, if the sand traps are inoperative and the pipe 71 is vented to atmosphere, only the smaller diaphragm 72 will be effective.

The brake cylinder 28 is connected by a pipe and communicating passage 74 with a space in the housing 29 to the right of the larger diaphragm 73. The thrust disc of the diaphragm 73 reacts to the right against the pilot stem 75 of the relay which is urged inward, that is to the left, by the coil compression spring 76. The stem 75 carries the balancing yoke 77, one end of which reacts against the stem of the exhaust valve 78 in a valve closing direction and the other of which reacts against the stem of the inlet valve 79 in an opening direction. The inlet valve 79 is of the familiar pilot poppet type and is supplied with pressure fluid from the supply reservoir 21 by way of the pipe 20 and the chamber 81.

When pressure is developed against the left face of the diaphragm face 72 and not against the left face of the larger diaphragm 73, then the relay will operate to establish in the brake cylinder 28 a pressure which is proportional to but lower than the pressure acting on the diaphragm 72. This is the low ratio setting. However, if pressure is developed on the left side of the diaphragm 73, an equal pressure will be developed in the brake cylinder 28. It follows that during a straight air application, if the sanders are in operative condition, pressure in the straight air pipe 12 will be effective between the diaphragms 72 and 73 and the brake cylinder 28 will be operated by the higher of the two braking ratios; whereas, if the sanding system is not operative on that particular car, the relay of that particular car will operate at the lower braking ratio. This presents a distinct difference from the mere imposition of a maximum limit of braking power. The ratio is effective throughout the entire braking range and this fact is of extreme importance in systems of the speed controlled or deceleration controlled type, because it is not merely the maximum braking pressure which determines whether or not sliding will occur. On the contrary, it is the relationship of braking pressure at any time to either speed or deceleration, depending upon the type of control used.

In this respect the present invention involves a marked advance over the broad ideas disclosed in my companion application Serial No. 367,143, filed November 25, 1940, to which application the present one is subordinate. It should be remembered that the purpose of any speed or deceleration controlled brakes is to operate the brakes throughout their entire range with a maximum intensity consistent with safety against wheel sliding. Such operation of the brakes is necessary if minimum stopping distances are to be attained. The automatic deceleration or speed controls operate to maintain this relatively high rate during any application in which the automatic control takes effect, hence a control of the maximum intensity, while useful, does not offer a complete solution of the problem where the brakes are intensively applied throughout the stop.

Figure 5:
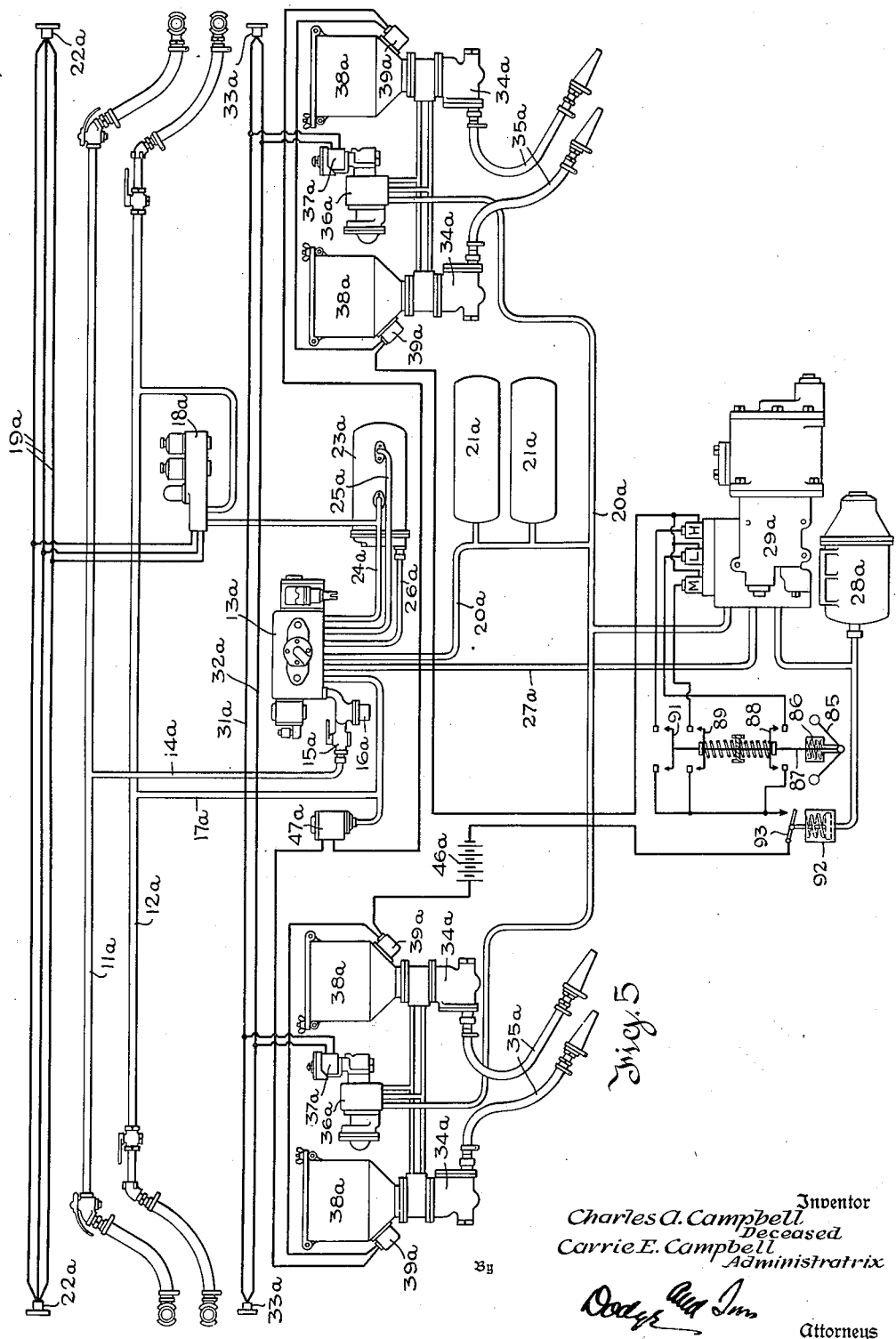
Fig. 5 is a diagrammatic view showing a modified embodiment of the invention.

*Modification, Fig. 5*

Fig. 5 shows a modified embodiment of the invention in which schedule HSC car brake equipment with a D-22-B control valve is arranged to be controlled by a speed responsive device on the car itself instead of being controlled from the head end of the train, as in the Campbell patent above identified. This type of installation is described in the instruction pamphlet #39 published by The New York Air Brake Company, January, 1940. The brake and sander installations in Fig. 5 conform generally to that shown in Figs. 1 to 4 and corresponding parts are given the same reference numerals with the distinguishing letters *a*. Thus the parts 11*a* to 53*a* of Fig. 5 correspond in detail with similarly numbered parts in Figs. 1 to 4, except as follows:

1. The supply and exhaust magnet valve unit 18*a* derives its air supply from the auxiliary reservoir connection 24*a* instead of from the supply reservoir connection 20*a*. Since the unit 18*a* operates only during straight air applications, the difference is not important so far as the present invention is concerned. The arrangement of Fig. 5 could be used with the system of Figs. 1–3 and vice versa.

2. The relay generally identified by the numeral 29*a* is of the well known A-2-A type which, instead of giving two braking ratios, gives four braking ratios and includes three magnet valves for controlling the selection of ratios.

3. There is no winding corresponding to the winding 48. There is, however, connected in the protective circuit, which includes the switches in the housing 39*a* in lieu of winding 48, a speed control switch which derives its energy from that circuit and controls the magnet valve windings which select the ratio established by relay 29*a*.

The present description, therefore, can be confined to the speed control switch and its connection with the magnet valve winding of the relay. The structure is not a feature of the invention because the relay is known in the art. Consequently only its ultimate functions require description in order to permit an understanding of how the present invention operates.

The relay 29*a* has three magnet valve windings indicated by the letters L, M and H, which generally indicate low ratio, medium ratio and high ratio. It may be helpful to comment, however, that there is a ratio between low and medium which takes effect when none of the three windings is energized.

The speed control switch includes a speed responsive element, such as the fly-ball governor 85, a spring 86 which positions the governor, an axial rod 87 which is forced upward on increase of speed, and three sets of contactors arranged to bridge associated contacts in the order hereinafter stated and to establish circuits through the windings L, M and H in the order hereinafter stated. The three contactors are 88, 89 and 91. The contactor 88 is held downward against a stop by a coil compression spring so that the rod 87 may move downward after the contactor 88 engages its contact. Similarly, the contactor 89 is held upward against a stop so that the rod 87 may move upward far enough to close the contactor 91 after the contactor 89 is closed. The spacing of the contactors is such that when the car is at rest, contactor 88 closes its circuit through the winding L. At 20 miles an hour contactor 88 interrupts its circuit. Thus below 20 miles an hour low speed winding is energized and conditions the relay 29a to establish a ratio of 40% between the pressure in the brake cylinder 28a and the pressure simultaneously existing in the control pipe 27a.

Between 20 miles an hour and 40 miles an hour the switch assumes the position shown in Fig. 5, in which all three windings L, M and H are deenergized. Relay 29a is then conditioned to establish a 60% ratio. At 40 miles an hour contactor 89 closes the circuit through winding M. This establishes an 80% ratio which persists until 65 miles an hour is attained, at which speed the contactor 91 closes the circuit through winding H so that both windings M and H are excited and the relay 29a establishes a 100% ratio. In other words, above 65 miles an hour pressure in the brake cylinder 28a equals pressure in the control pipe 27a.

The pressure switch, whose spring loaded motor is indicated at 92 and whose contactor is indicated at 93, is the well-known K-3 switch which is subject to brake cylinder pressure and is biased to an open position by a very light spring so that the protective circuit is interrupted except when there is a light effective braking pressure in the brake cylinder. Thus the protective circuit is inert unless a straight air application is made, that is, it is inert during automatic applications and always inert under running conditions with the brakes off.

It will be observed that in the 20 to 40 mile position of the speed responsive switch illustrated in Fig. 5, all three windings L, M and H are deenergized and the ratio is 60%. It follows that if any one of the switches in the cases 39a interrupts the protective circuit, the condition will be the same and the relay will be set for a 60% ratio, which is a safe ratio in the absence of sanding and is the ratio used during automatic applications with which sanding is generally unnecessary.

Attention is invited to the fact that the protective circuit does not suspend operation of the sander. It does, however, limit the intensity of straight air applications. This is true of straight air applications generally but, as stated, has particularly important functional aspects when the straight air applications are controlled in response to deceleration or in response to speed, or in any way which involves intensive working of the brakes throughout the stop.

It should be observed as to both embodiments of the invention disclosed in the present application that if sanding fails by exhaustion of sand during a brake application, the related brake system relay will immediately be set for the low or safe ratio, which means that the brakes will be released to a safe value.

Two commercial embodiments of the invention have been described in detail but various others are practicable, and to a considerable extent the form of such embodiment is dependent on the character of the brake control system. It is impossible to illustrate all the various systems which might be used, hence the specific disclosures here set forth are intended to be illustrative and in no sense are they limiting. The scope of the invention is defined in the claims.

What is claimed is:

1. In an air brake, the combination of a brake cylinder; a brake controlling valve device operable to establish brake controlling pressures; a relay interposed between the brake controlling valve device and the brake cylinder and serving in response to such controlling pressures to establish related pressures in the brake cylinder, said relay including means for changing the ratio between the controlling pressure and the related pressure; means for sanding wheels braked by said brake cylinder; protective means responsive to an inoperative condition of said sanding means; and connections between said protective means and the relay arranged to set the relay for a low ratio when the sanding means is inoperative.

2. In an air brake, the combination of a brake cylinder; a brake controlling valve device operable to establish brake controlling pressures; a relay interposed between the brake controlling valve device and the brake cylinder and serving in response to such controlling pressures to establish related pressures in the brake cylinder, said relay including means for changing the ratio between the controlling pressure and the related pressure; means for sanding wheels braked by said brake cylinder; protective means responsive to an inoperative condition of said sanding means; and connections between said protective means and the relay arranged to set the relay for a low ratio when the sanding means is inoperative and a higher ratio when the sanding means is operative.

3. In an air brake, the combination of a brake cylinder; a brake controlling valve device operable to establish brake controlling pressures; a relay interposed between the brake controlling valve device and the brake cylinder and serving in response to such controlling pressures to establish related pressures in the brake cylinder, said relay including means for changing the ratio between the controlling pressure and the related pressure whereby the relay may be set to establish any selected one of a plurality of such ratios; automatic controlling means responsive to a function of vehicle speed and operatively related with said ratio changing means of the relay to select the ratio according to such function of speed; means for sanding wheels braked by said brake cylinder; protective means responsive to an inoperative condition of said sanding means; and connections between said protective means and the ratio changing mechanism of said relay so arranged that when the sanding means is inoperative control of the relay by said automatic controlling means is inhibited and the relay is set to establish a low ratio.

4. In an air brake, the combination of a brake cylinder; a brake controlling valve device operable to establish brake controlling pressures;

a relay interposed between the brake controlling valve device and the brake cylinder and serving in response to such controlling pressures to establish related pressures in the brake cylinder, said relay including means for changing the ratio between the controlling pressure and the related pressure whereby the relay may be set to establish any selected one of a plurality of such ratios; automatic controlling means responsive to a function of vehicle speed and operatively related with said ratio changing means of the relay to select the ratio according to such function of speed; means for sanding wheels braked by said brake cylinder; protective means responsive to an inoperative condition of said sanding means; and connections between said protective means and the ratio changing mechanism of said relay so arranged that when the sanding means is inoperative control of the relay by said automatic controlling means is inhibited and the relay is set to establish a ratio lower than the maximum and approximating the highest ratio consistent with absence of sanding.

5. In an air brake system, the combination of a brake cylinder; a brake controlling valve device operable selectively on the automatic principle and on the straight air principle to establish brake controlling pressures; a relay interposed between the brake controlling valve device and the brake cylinder and serving in response to such controlling pressures to establish related pressures in the brake cylinder, said relay including means for changing the ratio between the controlling pressure and the related pressure; means effective when the brake controlling valve device operates on the automatic principle to cause the relay to operate at the lower of said two ratios; means effective when the brake controlling valve device operates on the straight air principle to cause the relay to operate at the higher of said two ratios; means for sanding wheels braked by said brake cylinders; protective means responsive to an inoperative condition of said sanding means; and connections whereby said protective means causes said relay to operate at said lower ratio irrespective of the character of operation of said brake controlling valve device.

6. In an air brake, the combination of a brake cylinder; a brake controlling valve device operable selectively on the automatic principle and on the straight air principle and serving to establish brake controlling pressures; a relay interposed between the brake controlling valve device and the brake cylinder and serving in response to such controlling pressures to establish related pressures in the brake cylinder, said relay including means for changing the ratio between the controlling pressure and the related pressure whereby the relay may be set to establish any selected one of a plurality of such ratios, the connections being such that when the brake controlling valve device operates on the automatic principle a relatively low ratio will be established and maintained; automatic controlling means responsive to a function of vehicle speed and operatively related to said ratio changing means of the relay at least when said brake controlling valve device operates on the straight air principle, said automatic controlling means serving to select the ratio according to such function of speed; means for sanding wheels braked by said brake cylinder; protective means responsive to an inoperative condition of said sanding means; and connections between said protective means and the ratio changing mechanism of said relay so arranged that when the sanding means is inoperative control of the relay by said automatic controlling means is inhibited and the relay is set to establish a low ratio.

7. In an air brake, the combination of a brake cylinder; a brake controlling valve device operable selectively on the automatic principle and on the straight air principle and serving to establish brake controlling pressures; a relay interposed between the brake controlling valve device and the brake cylinder and serving in response to such controlling pressures to establish related pressures in the brake cylinder, said relay including means for changing the ratio between the controlling pressure and the related pressure whereby the relay may be set to establish any selected one of a plurality of such ratios, the connections being such that when the brake controlling valve device operates on the automatic principle a relatively low ratio will be established and maintained; automatic controlling means responsive to a function of vehicle speed and operatively related to said ratio changing means of the relay at least when said brake controlling valve device operates on the straight air principle, said automatic controlling means serving to select the ratio according to such function of speed; means for sanding wheels braked by said brake cylinder; protective means responsive to an inoperative condition of said sanding means; and connections between said protective means and the ratio changing mechanism of said relay so arranged that when the sanding means is inoperative control of the relay by said automatic controlling means is inhibited and the relay is set to establish the ratio which is established during operation of the brake controlling valve device on the automatic principle.

CARRIE E. CAMPBELL,
*Administratrix of the Estate of Charles A. Campbell, Deceased.*